(12) United States Patent
Brown et al.

(10) Patent No.: US 7,200,215 B2
(45) Date of Patent: Apr. 3, 2007

(54) TIME BASED REGULATION OF ACCESS TO CALLEES

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 10/081,024

(22) Filed: Feb. 21, 2002

(65) Prior Publication Data

US 2003/0156700 A1    Aug. 21, 2003

(51) Int. Cl.
*H04M 3/432* (2006.01)
*H04M 3/436* (2006.01)

(52) U.S. Cl. ............... 379/210.01; 379/88.02; 379/93.02; 379/142.05; 379/196; 379/201.02; 379/207.13; 379/210.02

(58) Field of Classification Search ............ 379/93.03, 379/201.01, 88.01, 88.02, 93.02, 142.05, 379/188, 196–200, 201.02, 207.13, 210.01, 379/210.02
See application file for complete search history.

(56) References Cited

U.S. PATENT DOCUMENTS

| | | | |
|---|---|---|---|
| 4,266,098 A | 5/1981 | Novak | 379/77 |
| 4,278,844 A * | 7/1981 | Jones | 379/157 |
| 5,181,238 A * | 1/1993 | Medamana et al. | 379/93.03 |
| 5,229,764 A * | 7/1993 | Matchett et al. | 340/5.52 |
| 5,499,288 A | 3/1996 | Hunt et al. | 379/88 |
| 5,566,229 A | 10/1996 | Hou et al. | 379/88 |
| 5,651,055 A * | 7/1997 | Argade | 379/88.01 |
| 5,673,404 A | 9/1997 | Cousins et al. | 395/347 |
| 5,724,408 A | 3/1998 | Morganstein | 379/88.2 |
| 5,757,899 A * | 5/1998 | Boulware et al. | 379/196 |
| 5,790,637 A | 8/1998 | Johnson et al. | 379/67 |
| 5,802,161 A | 9/1998 | Svoronos et al. | |

(Continued)

FOREIGN PATENT DOCUMENTS

EP    0585004 A2    3/1994

(Continued)

*Primary Examiner*—Harry S. Hong
(74) *Attorney, Agent, or Firm*—Mark S. Walker; Amy J. Pattillo

(57) ABSTRACT

A method, system, and program for time based regulation of access to callees are provided. An authenticated identity of a caller placing a call is preferably detected. Then, a communication link from the caller to a callee is only attempted if the authenticated identity of the caller is allowed access to the callee according to a schedule associated with an identity of the callee.

30 Claims, 11 Drawing Sheets

U.S. PATENT DOCUMENTS

| | | | |
|---|---|---|---|
| 5,822,400 A | 10/1998 | Smith | |
| 5,872,841 A | 2/1999 | King et al. | 379/210.01 |
| 5,884,032 A * | 3/1999 | Bateman et al. | 709/204 |
| 5,889,845 A | 3/1999 | Staples et al. | 379/211.02 |
| 5,913,196 A * | 6/1999 | Talmor et al. | 704/270 |
| 5,915,001 A | 6/1999 | Uppaluru | 379/88.22 |
| 5,937,044 A | 8/1999 | Kim | |
| 5,940,476 A | 8/1999 | Morganstein et al. | 379/88.02 |
| 5,946,386 A * | 8/1999 | Rogers et al. | 379/265.09 |
| 5,946,654 A | 8/1999 | Newman et al. | 704/246 |
| 5,978,467 A | 11/1999 | Walker et al. | 379/266.01 |
| 6,038,305 A | 3/2000 | McAllister et al. | 379/207 |
| 6,058,364 A | 5/2000 | Goldberg et al. | 704/252 |
| 6,101,242 A | 8/2000 | McAllister et al. | 379/88.02 |
| 6,115,613 A | 9/2000 | Jonsson | |
| 6,122,357 A | 9/2000 | Farris et al. | 379/207 |
| 6,160,877 A * | 12/2000 | Tatchell et al. | 379/197 |
| 6,178,230 B1 | 1/2001 | Borland | 379/67.1 |
| 6,178,240 B1 | 1/2001 | Walker et al. | 379/266.01 |
| 6,263,071 B1 * | 7/2001 | Swan et al. | 379/372 |
| 6,324,271 B1 * | 11/2001 | Sawyer et al. | 379/142.05 |
| 6,327,346 B1 | 12/2001 | Infosino | 379/88.02 |
| 6,359,971 B1 | 3/2002 | Haimi-Cohen et al. | 379/88.01 |
| 6,381,316 B2 | 4/2002 | Joyce et al. | 379/114.2 |
| 6,671,672 B1 | 12/2003 | Heck | |
| 6,724,866 B2 | 4/2004 | Kuhn et al. | 379/88.21 |
| 6,826,173 B1 | 11/2004 | Kung et al. | |
| 2002/0085698 A1 * | 7/2002 | Liebenow | 379/207.13 |
| 2002/0154752 A1 * | 10/2002 | Carpenter | 379/201.01 |
| 2003/0156695 A1 | 8/2003 | Brown et al. | 379/188 |
| 2003/0156696 A1 | 8/2003 | Brown et al. | 379/196 |
| 2003/0156707 A1 | 8/2003 | Brown et al. | 379/201.01 |
| 2003/0161456 A1 | 8/2003 | Brown et al. | 379/188 |

FOREIGN PATENT DOCUMENTS

| | | |
|---|---|---|
| EP | 0676882 A2 | 10/1995 |
| JP | 8139797 A | 5/1996 |
| JP | 10294784 A | 11/1998 |

* cited by examiner

TIME BASED REGULATION OF ACCESS TO CALLEES

CROSS-REFERENCE TO RELATED APPLICATIONS

The present application is related to the following co-pending applications:

(1) U.S. patent application Ser. No. 10/081,014, titled "Rating Parties According to Party Identities";

(2) U.S. patent application Ser. No. 10/081,029, titled "Third Party Regulation of Calls Through a Particular Line Based on a Call Context";

(3) U.S. Pat. No. 6,917,672, issued Jul. 12, 2005 titled "Third Party Regulation of Calls Based on the Caller and Callee Pair to a Call";

(4) U.S. patent application Ser. No. 10/082,418, titled "Time Based Regulation of Use of a Telephone Line";

BACKGROUND OF THE INVENTION

1. Technical Field

The present invention relates in general to telecommunications and, in particular, to call party identification. Still more particularly, the present invention relates to time based regulation of access to callees.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

However, the ring or buzz of a telephone is often an unwanted intrusion. Most widely recognized, calls from telemarketers are often an unwanted intrusion at any time of the day.

Some calls are only an unwanted intrusion depending on the schedule of the person interrupted by the telephone ring. For example, calls from a family member to chat during a busy work day may unwanted, but during an evening break may be appreciated.

Caller ID is often subscribed to by telephone subscribers who wish to screen calls. Caller ID includes the line number from which a call is placed and may also indicate the name of the line subscriber associated with the line.

However, caller ID is limited in many contexts. First, caller ID only identifies the line subscriber to a telephone line and not the identity of the person actually placing the call. Second, a telephone subscriber may block caller ID from being transferred to the recipient of a call. Third, even though the recipient may screen who is calling, the phone number dialed still rings, causing an intrusion into the home.

Another service allows a telephone subscriber to block calls received from certain caller IDs. However, blocking calls according to caller ID only blocks a particular phone line and does not block a caller from utilizing an alternate phone line to place a call. In addition, blocking calls according to caller ID is not schedule dependent.

Therefore in view of the foregoing, it would be advantageous to provide a method, system, and program for controlling access to a destination line according to the identity of the person placing a call. In addition, it would be advantageous to provide a method, system, and program for controlling access for particular callers to a destination line according to the schedule of the attempted callee.

SUMMARY OF THE INVENTION

In view of the foregoing, it is therefore an object of the present invention to provide an improved telecommunications system.

It is another object of the present invention to provide a method, system and program for improved call party identification.

It is yet another object of the present invention to provide a method, system and program for time based regulation of access to callees.

According to one aspect of the present invention, an authenticated identity of a caller placing a call is preferably detected. Then, a communication link from the caller to a callee is only attempted if the authenticated identity of the caller is allowed access to the callee according to a schedule associated with an identity of the callee.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
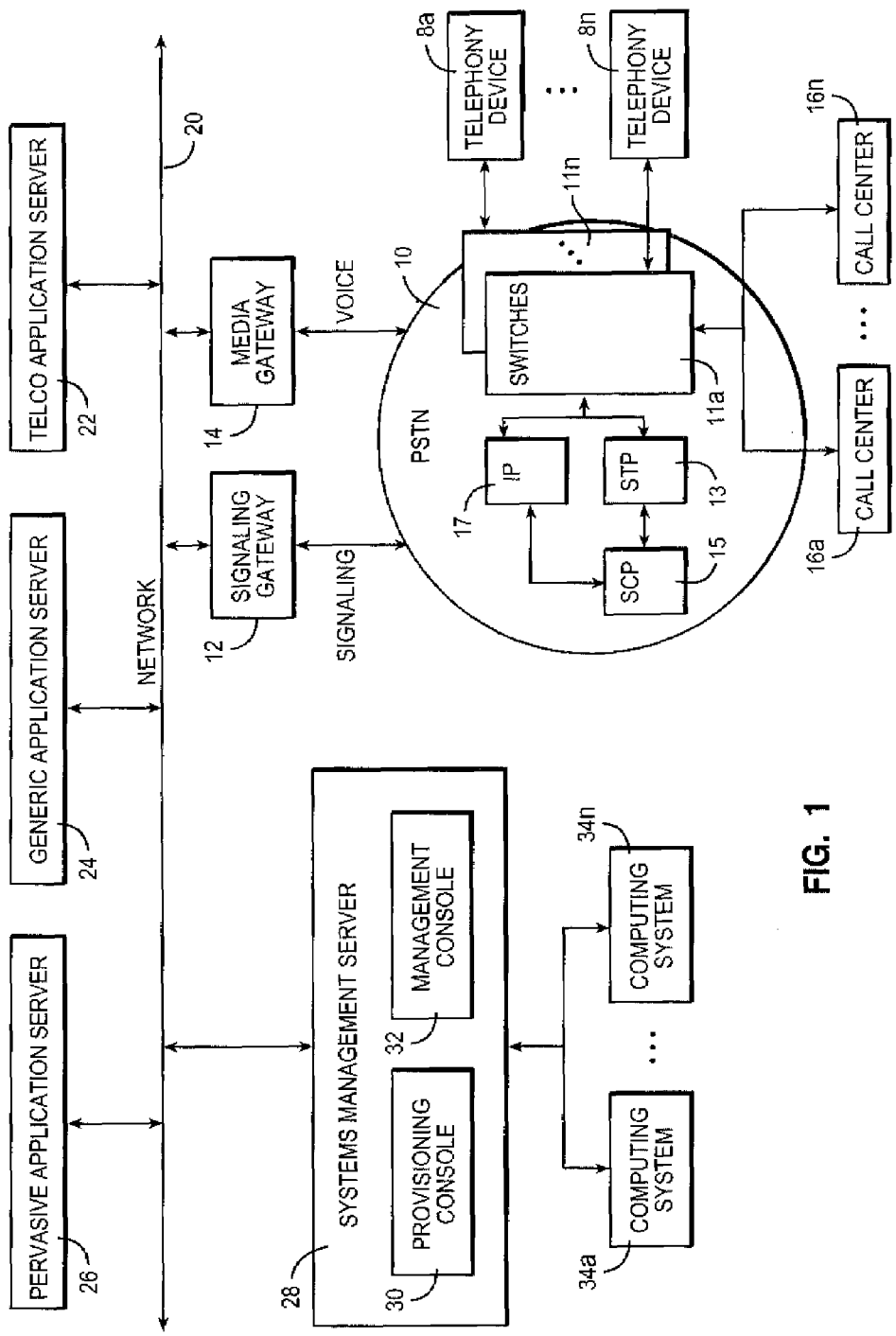
FIG. 1 depicts a block diagram of a network environment in which the present invention may be implemented.

A method, system, and program for time based regulation of access to a callee are provided. Preferably, for each call, the context of the call, including relevant scheduled events, may be determined. The context of a call may include, but is not limited to, the identity of the caller or callee, the identity of devices utilized for the call, the location of the devices utilized for the call, the path of a call, relevant scheduled events for a call, and a billing plan for the call.

In particular, determining relevant scheduled events and other context for a call may be performed by a context inference engine located within an Intelligent Peripheral of the trusted telephone network and/or located within a telecommunications (Telco) Application service outside the trusted telephone network. As will be further described, the Telco application service located outside the trusted telephone network is enabled to provide services to callers and callees via enhanced security channels.

For purposes of the present invention, it is advantageous to authenticate the identity of the caller, such that time based access to a callee may be regulated. In particular, identity authentication is preferably performed by authenticating the voices of the caller and callee. Identity authentication may be initiated by the origin device originating the call, the intermediary device processing the call, or the destination device receiving the call. Each of the devices may also access a third party or external server to perform the identity authentication. Performance of identity authentication has different advantages depending on the device initiating and performing the identity authentication.

While as described, authentication of a caller or callee identity is described with emphasis placed on voice authentication, other methods of caller and callee identity authentication may also be performed. Voice samples utilized for voice authentication are just one of multiple types of biometric sampling. For example, a caller or callee may locally provide an eye scan, a fingerprint, and other biophysical identifiers that are transmitted within or outside the trusted network to authenticate the identity of the caller or callee. Alternatively, keypad entries, such as a pin code, account number, password, or other secure transaction key may be entered by a caller or callee and utilized to authenticate the identity of the caller or callee.

In addition, for purposes of the present invention, it is advantageous to determine relevant scheduled events for the callee or destination device attempted for contact by the caller. Scheduled events may be designated according to the authenticated identity of a caller.

For example, a scheduled event may schedule when Jon's mother may call him during the week. If Jon's mother is authenticated as the current caller, then the scheduled event designating when Jon's mom is allowed to call would be considered a relevant scheduled event useful for regulating access to Jon.

In another example, a current scheduled event may indicate a priority level. Another database may include ratings given according to authenticated identity. If the current caller's rating meets the priority level, then the current caller may be allowed access.

Advantageously, an intrusion in the form of a ring, a vibration, other alerting signals, will only be performed if the caller is allowed to ring through the call to access the callee. In particular, a ring through may include multiple types of intrusions, including an sound intrusion, a text intrusion, a video intrusion, and a combination of intrusions to a telephony device or a device associated with a telephony device.

If the caller is not currently allowed access to the callee, the call may be automatically transferred to a voice mail service. In addition, a message may be specified for output to the caller that indicates specified times when it would be preferable for that caller to access the callee.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In addition, for purposes of the present invention, a trusted telephone network preferably includes a traditional trusted telephone network, however also includes, but is not limited to, an Internet Protocol telephony network, a digital telephone network, and other communication networks.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

First, the network environment incorporates a Public switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

Network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

Advantageously, as will be further described, the identity of both the caller and the callee may be authenticated by one of telephony devices 8a–8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a–34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Looking into PSTN 10, a telephone network typically includes multiple switches, such as central office switches 11a–11n, that originate, terminate, or tandem calls. Central office switches 11a–11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a–11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. Advantageously, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a–11n may also send voice and signaling messages to intelligent peripherals (IP) 17 via voice trunks and signaling channels. IP 17 provides enhanced announcements, enhanced digit collection, and enhanced speech recognition capabilities.

Advantageously, the identity of a caller may be authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a caller may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a caller identity authentication service from telco application server 22. In particular, a signaling channel is opened between central office switches 11a–11n and telco application server 22 via signaling gateway 12. In addition, a voice channel is opened between central office switches 11a14 11n and telco application server 22 via media gateway 14.

Because telco application server 22 is located outside of the trusted network, there may be a time delay associated with establishing a connection to telco application server 22 and authenticating the identity of a caller that is longer than a time delay present where a caller identity is authenticated by IP 17.

In addition, because telco application server 22 is located outside of the trusted network, it is advantageous to establish a level of security for transactions between telco application server 22 and central office switches 11a14 11n, wherein the level of security is suitable for untrusted communications. A level of security may be implemented by utilizing security based protocols, such as the secure socket layer, and by applying ordinary encryption. In particular, the level of security preferably protects the communication channel between telco application server and PSTN 10 and authenticates the identity of the server from which a caller identity authentication service is accessed. Therefore an additional feature of signaling gateway 12 and media gateway 14 is security verification.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. For purposes of the present invention, the business that the caller is calling on behalf of is also indicated in the VID. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15.

In addition, as previously described, caller authentication to determine VIDs and RVIDs may be performed by an external system, such as telco application server 22. The VID or RVID returned from telco application server 22 may be transferred from central office switches 11a–11n to SCP 15 in order to access a subscriber profile associated with the VID or RVID. Alternatively, the VID or RVID may first transfer to IP 17, where additional verification of the caller identity is performed. For example, IP 17 may control distribution of the VID to the caller, where the caller is prompted to enter a password or additional information. IP 17 may then initiate loading the caller profile into central office switches 11a–11n if the additional caller input is verifiable for the VID.

An origin telephony device or destination telephony device may also determine a VID and/or RVID for the caller and/or callee of a call. In particular, telephony devices 8a–8n and call centers 16a–16n may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a–8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a–8n.

In addition, telephony devices 8a–8n may each incorporate a display that provides a visual output of a VID or RVID. Alternatively, such a display may be provided in a separate device connected to the line in parallel to telephones 8a–8n. Advantageously, the identity of the actual caller or actual callee may be output to a display in association with a call. In addition, other context information about the caller including, but not limited to, the device from which the call originates or is answered, ratings for a caller or callee, and other context information may be output to a display in association with a call. In particular, where output of the identity of the actual caller or actual callee is blocked, display of other context information may not be blocked, such that context for the call may be provided without revealing the actual identity of the caller or callee.

Telephony devices 8a–8n are communicatively connected to PSTN 10 via wireline, wireless, ISDN, and other communication links. Preferably, connections to telephony devices 8a–8n provide digital transport for two-way voice grade type telephone communications and a channel transporting signaling data messages in both directions between telephony devices 8a–8n and PSTN 10.

In addition to telephony devices 8a–8n, advanced telephone systems, such as call centers 16a–16n, may be communicatively connected to PSTN 10 via wireline, wireless, ISDN and other communication links. Call centers 16a–16n may include PBX systems, hold queue systems, private network systems, and other systems that are implemented to handle distribution of calls to multiple representatives or agents.

Returning to central office switches 11a–11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriber's line might terminate on a pair of terminals on the main distribution frame of one of central office switches 11a–11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to transfer the call if appropriate, to apply distinctive ringing, etc.

Authentication of the identity of the caller may be preferably initiated in IP 17 or telco application server 22. Once a VID for a caller is received at a central office switch, a context inference application is initiated in IP 17 or telco application server 22. The context inference service preferably requests a caller profile according to VID to determine billing information and personal information about the caller. In addition, the context inference service preferably determines the identity of the device utilized by accessing a device directory, prompting the caller to indicate the device identity, or other methods. Further, the location of the device may be inferred from information provided by the central office switch originating the call, a GPS location, and the location assigned to a line number. Other context information, such as the subject matter of a call and the role in which a caller is placing the call, are preferably determined as well. The context information is preferably loaded with the VID at the central office switch.

As a call is forwarded or transferred to other callers and callees, IP 17 or telco application server 22 are preferably initiated to update the context for a call. For example, the context may indicate the path of line number accessed in a call and whether the call was transferred or forwarded.

The context information may be filtered at the central office switch according to general filtering preferences indicated by a caller in the caller profile. In addition, context information may be filtered according to caller filtering preferences specifically selected for the callee. Context information is then transferred with the call routed by one or more central office switches to a destination central office switch that services the called party's station or line.

Then, the context information is forwarded with a caller VID to the callee device. In particular, the caller may provide the line number requested and/or may enter an identifier for the intended callee. A search engine may be accessed within IP 17 or telco application server 22 that queries at least one device associated with a callee to attempt to locate the intended callee. A callee profile accessible according to the intended callee identity may include line number subscriptions and recently used line numbers, such that the search engine may query those line numbers to locate the intended callee.

According to a preferred embodiment of the present invention, the destination device for a call preferably filters the context received for a call to determine whether to attempt to access a callee at the destination device. In particular, relevant scheduled events may be associated with the destination device, where those relevant scheduled events designate access to callees at the destination device. In addition, a relevant scheduled events may be associated with a callee associated with a destination device, whose those relevant scheduled events designate access to a particular callee at the destination device. Where one destination device is utilized by multiple individuals, distinctive ring sounds may be assigned to distinguish the particular callee for which a call is intended.

The destination device may include a data storage system for storing scheduled events. However, the destination device may also access telco application server 22 with a request for relevant scheduled events according to the context of the call. Telco application server 22 may search other databases for scheduling information relevant to the destination device and/or any specific callees.

Figure 2:
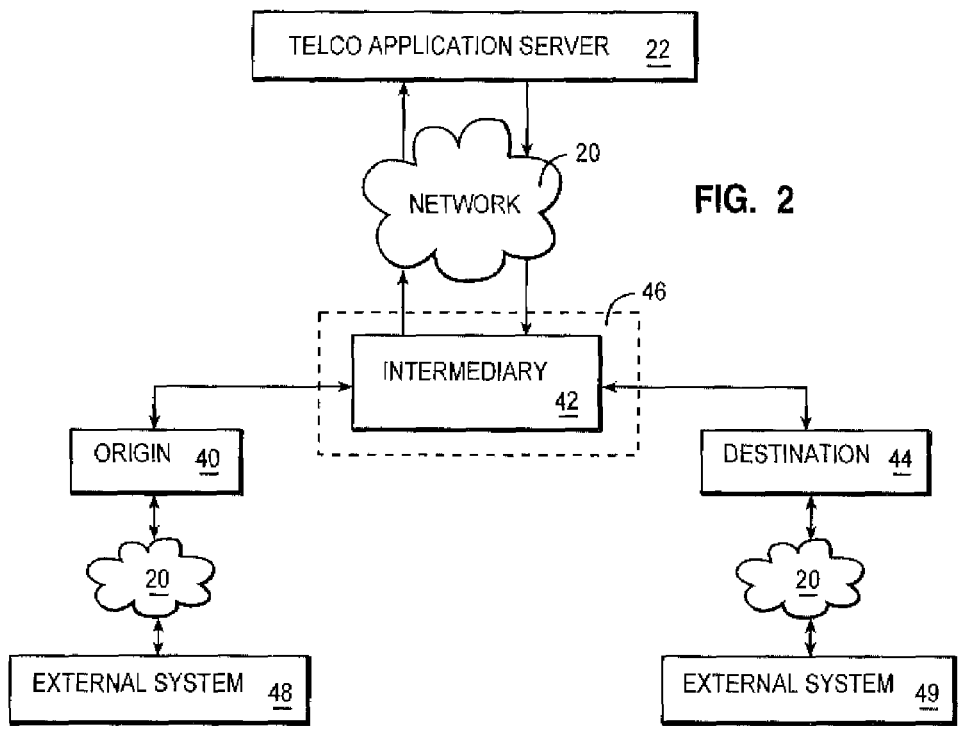
FIG. 2 illustrates a block diagram of an identification system in accordance with the method, system, and program of the present invention.

Referring now to FIG. 2, there is illustrated a block diagram of an identification system in accordance with the method, system, and program of the present invention.

Origin device 40 is utilized by a caller to initiate a call. The caller is prompted by the device performing caller authentication to provide a voice utterance. A VID for the caller is provided to intermediary device 42 from the device performing caller authentication. The VID is utilized to access a caller profile that includes service preferences and billing information. In addition, the VID is transmitted with the call to destination device 44 for identifying the caller.

In general, caller identity authentication is performed by receiving a voice utterance from a caller, analyzing the voice utterance for sound qualities and content, and attempting to match the sound qualities and content of a voice utterance to a voice template previously recorded for a caller, to authenticate the identity of the caller. If there is a match between the voice utterance and a voice template, then a VID is determined for the caller and utilized to authenticate the caller identity for retrieving a caller profile and billing the caller. However, in alternate embodiments, the identity of a caller may be authenticated according to passwords, eye scans, encryption, and other biometric methods.

Caller identity authentication may be initiated by origin device 40. In particular, origin device 40 may include voice templates and a feature for performing the caller identity authentication. In addition, origin device 40 may access a third party server 48 via network 20, where third party server 48 may provide access to a database of voice templates and/or perform the caller identity authentication. Origin device 40 then transmits a VID determined for the caller to intermediary device 42 for use in specifying services and billing for a call from origin device 40. Origin device 40 may include a caller telephony device, a PBX, a call center, a private switching system, network servers, feature servers, and other systems which provide call origination. Third party server 48 may include a telco application server, a generic application server, a database management system server, and other systems that function outside trusted telephone network 46. In particular, intermediary device 42 may facilitate communication between origin device 40 and network 20.

In addition, caller identity authentication may be initiated by intermediary device 42. Intermediary device 42 may include database systems that store voice templates and an IP for performing caller identity authentication. In addition, intermediary device 42 may access telco application server 22 outside of trusted telephone network 46 via network 20, where telco application server 22 provides a caller authentication service and/or provides access to a database of voice templates. Intermediary device 42 may include a PSTN switching network or networks. However, intermediary device 42 may also include a PBX, a call center, or other private switching system. Further, intermediary device 42 may include network servers, Websphere® (Websphere® is a registered trademark of International Business Machines Corporation (IBM)) servers, and other systems which provide call processing.

Further, caller identity authentication may be initiated by destination device 44. Destination device 44 may include voice templates and a feature for performing the caller identity authentication. In addition, destination device 44 may access a third party server 49 via network 20, where third party server 49 may provide access to a database of voice templates and/or perform the caller identity authentication. Destination device 44 will prompt a caller to provide a voice utterance at origin device 40, where intermediary device 42 facilitates communications between origin device 40 and destination device 44. Destination device 44 then determines and transmits a VID for the caller to intermediary device 42 for use in specifying services and billing for a call from origin device 40. Destination device 44 may include a callee telephony device, a PBX, a call center, a private switching system, network servers, feature servers, and other systems which provide call receipt. Third party server 48 may include a telco application server, a generic application server, a database management system server, and other systems that function outside trusted telephone network 46. In particular, intermediary device 42 may also facilitate communication between destination device 44 and network 20.

Similarly, a destination device 44 is utilized by a callee to receive a call. Advantageously, an authenticated identity of the callee may be determined as an RVID. Callee identity authentication may be initiated by origin device 40, intermediary device 42, or destination device 44, in a manner similar to initiation of caller identity authentication, as described above.

In particular, both the identity of an intended callee and the identity of an accessed callee may be determined in RVIDS. The intended callee RVID may be authenticated, for example, from a messaging system utilized by the callee.

In addition to authenticating the identity of a caller or callee in a VID or RVID, the context of the call is preferably determined and transmitted as part of the VID or RVID or separate therefrom. Origin device 40, intermediary device 42, telco application server 22, and/or destination device 44 may include context inference services that perform context inference services. A context inference service may utilize context information gathered from multiple databases and may gathered context information directly from a caller or callee in response to prompts.

Context may include, but is not limited to, an intended callee, a subject matter of a call, a device identity, the location of an origin or destination device, billing information, service subscriptions, the path of a call, and other information which may provide a caller or callee with context of a call. Call context may indicate when a call is made or received on behalf of another individual or business. In addition, call context may indicate in the path of a call whether a backup for the intended caller is accessed.

Information for determining the context of a call may be gathered from a caller or callee profile, from routing information utilized by intermediary 42 from a device directory, from systems management server 28, or other databases of information. Particularly helpful for determining context, calendaring and other electronic scheduling databases included in a caller or callee profile may be utilized to determine location, subject, and times available for a call. In addition, the context inference service may, for example, infer the subject matter of a call as either business or personal based on the identity of the device from which a call originates and the location of that device. Alternatively, the subject of a call as either a business subject or personal subject may be inferred from the billing information context.

From the context of a call, a rating of the caller and/or callee may be determined by a context rating service executing within intermediary device 42 or telco application server 22. In particular, individual ratings may be associated with each portion of the context of a call. In particular, the ratings are preferably determined based on previous ratings for the caller, callee, and/or other context. In addition, both globally accessible and locally accessible databases may store previous ratings.

Preferably, at least one relevant scheduled event is accessed in association with destination device 44 or callee available at the destination device 44. The relevant scheduled event provides a context for whether an attempted communication through destination device 44 will be implemented. A communication will not be attempted where the caller VID is not allowed for the current time period.

Figure 3:
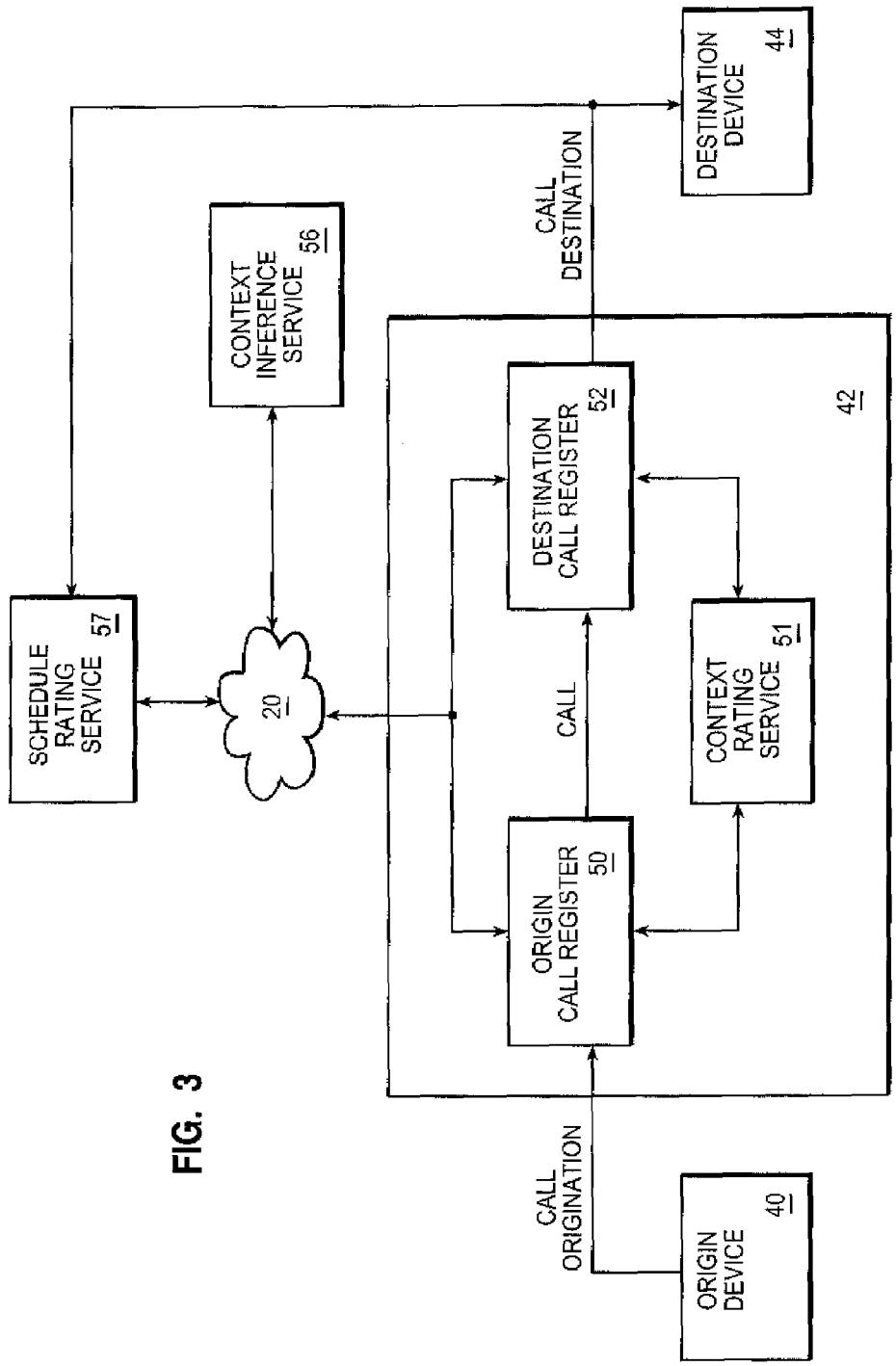
FIG. 3 depicts a block diagram of the flow of a call for time based regulation in accordance with the method, system, and program of the present invention.

A VID or RVID may be transferred in multiple protocols, including, but not limited to, Interface Definition Language (IDL) and Extensible Markup Language (XML). A VID or RVID may include a range of information, where each type of information may be tagged or identified in some other manner. For example, the following tagged VID may be transmitted to represent an authenticated identity of a caller and context of the call:

[caller name] Jon Smith, sales person
[caller rating] +4
[caller device] Jane Doe's cell phone
[caller location] Central Time zone, Austin, Tex.
[caller on behalf of] Business XYZ
[call subject] Product A
[call billing] Jon Smith's business service provider C
[authenticated by] Jane Doe's cell phone, service provider C With reference now to FIG. 3, there is depicted a block diagram of the flow of a call for time based regulation in accordance with the method, system, and program of the present invention. As illustrated, origin device 40 transfers a call request to intermediary device 42. The call request may be an off-hook condition for a wireline device or a network service connection request for a wireless device.

Preferably, a switching service receiving the call request establishes an origin call register 50 and retrieves a line subscriber profile for the origin device line number. The line subscriber profile may be accessed from an SCP or a data storage system external to trusted telephone network 46.

Next, a context inference service may be initiated by the origin switching service. In particular, a context inference service may be located within trusted network 46 as an IP or located outside trusted telephone network 46 within a telco application server accessible via network 20, such as context inference service 57.

The context inference service preferably determines context for a call including, but not limited to, who is calling, an intended callee, the device utilized to place the call, the location of the caller, the billing method for the call, the path of the call, and/or the subject matter of the call. In addition, the context inference service preferably determines context for a call including, but not limited to, who receives a call, the path of line numbers utilized to access the callee, the device utilized to receive the call, the location of the callee, and the subject matter available for discussion by the callee. In addition, other categories of context may be determined.

To determine the context of the device utilized to place a call, the entity subscribing to the line number and/or an identifier for the device are preferably accessed. The first set of context clues is provided to the context inference service by the line subscriber profile. In particular, a line subscriber profile indicates the individual or business that subscribes to a particular line number. Further, a line subscriber profile may indicate that a business subscribes to a telephone service, but provide that service is subscribed to for use by a particular employee or group of employees.

In addition, the line subscriber profile indicates the billing information and services subscribed to by the line subscriber. Billing information may provide context for whether the line number is a business line or personal line. In addition, a billing context for a call may indicate the party responsible for charges incurred in the call.

Further, a line subscriber profile preferably indicates whether the line number is subscribed to for a wireline device, a wireless device, or both. Additional context information may be inferred from whether a wireline or wireless device is utilized.

In addition to determining the identity of a person associated with a line number, detecting and/or inferring the identity of the device itself is particularly advantageous context information. Preferably the identity of the device may be inferred from the line subscriber profile and other information available. A device identity may include a device name, a line number utilized to access the device, and the device type. The device name may be assigned by the line subscriber and output with a signal from the device. Alternatively, the line subscriber profile may indicate the device name. The device type may indicate the type of line utilized to access the device, including, but not limited to, wireline, wireless, or multiplexed. In addition, the device type may indicate the type of device accessed by the line including, but not limited to, a car telephone line, a computer modem line, a PBX land line, a residential line, a business line, or an Asymmetric Digital Subscriber Line (ADSL) multiplexed line.

Further, determining or inferring the location of a device is advantageous context information. For a wireless device, the location of a device may be determined most precisely where a GPS tracking system is utilized by the origin device 40 or intermediary device 42, to determine the exact geographical location of a caller. For a wireline device, the location of the device is fixed according to the location the service is installed for the number.

In addition, for both a wireline and wireless device, a general location of the originated call may be determined from the geographical area covered by the switching center receiving the call. Wireless devices are preferably provided service by a particular tower or other signal distribution point. The geographical location and area covered by that tower may provide a general location of the origin of a call. As the origin device moves from one wireless coverage area to another, the location may be updated.

The context inference service may infer additional context from location information. For example, the time zone of the caller, the direction of movement of the caller, and other location related information may be inferred from location information.

In addition to extending a dial tone to a caller, an identity of the caller is preferably authenticated and loaded into origin call register 50. A caller profile accessed according to the VID is then accessed and loaded into origin call register 50. The context inference service preferably utilizes the caller profile and VID as additional context clues for the call.

The VID provides the context of who is placing the call. The caller profile provides further context based on the billing information and service subscriptions of the caller. For purposes of the present invention, the caller profile may indicate the business on behalf of which a caller places calls and the expertise area of that caller.

In addition, a caller profile may include preferences for filtering context information depending on multiple factors. Such factors may include, but are not limited to, the callee, the device placing the call, the device receiving the call, the time of day, a caller's schedule, and other variables selected by the caller.

The subject matter of a call may be determined by prompting a caller to provide a voice or text entry indicating the subject matter of the call. Alternatively, the context inference service may infer the subject matter of a call based on the caller's schedule. The context inference service may also infer the subject matter of a call based on the caller's business, expertise, or the business associated with the line number utilized by the caller.

In addition, a caller profile may include multiple roles that a caller takes. For example, a caller may be a parent, a business person, a coach, and a volunteer. The context inference service may infer which role the caller is taking depending on other context or may prompt the caller to select a role. Further, the caller may select, at origin device 40, a role for the call when placing the call request.

The context information for the call is transferred to destination device 44, such that destination device 44 is provided with a context for the call. The context information available in destination call register 52 may be filtered prior to transmittal to destination device 44 according to filtering preferences associated with the device, a line subscriber, or the callee.

Advantageously, destination device 44 may filter call context through a schedule regulator service within destination device 44 or accessible via network 20. For example, schedule regulator service 57 within destination device 44 filters call context according to relevant scheduled events for destination device 44 and/or for an intended callee.

Current relevant events for a callee may be determined as part of the context of a call. In particular, an electronic calendar or other database storing events may be accessed according to a callee identity from a caller profile or from an external calendaring data management system. In addition, where other devices are detected within a local network area of the origin device 40, electronic schedules and other event information may be accessed about a current event for the caller from the other devices or according to the identities of other parties participating in an event with the caller.

In addition, current relevant events may be determined for destination device 44. The line subscriber to destination device 44 may designate a schedule for destination device 44 or other parties may designate a schedule for destination device 44. A schedule for destination device 44 may indicate when, for example, different members of a family area allowed to receive calls and who family members may receive calls from during certain hours. More specifically, for example, a parent may regulate a children's line to receiving calls from friends and family between 5 PM and 8 PM and only from family at other times.

A current relevant event may include a meeting, appointment, location, others involved in the event, duration of the event, and other information that describes the previous, current, or future environments in which a callee may be located. The current relevant event may be described with or without time boundaries.

Advantageously, a current relevant event may also include callers who are allowed to access the callee or destination device during a particular time period. The allowed caller designations may be included concurrently with another relevant event, such as a meeting or may be defined independently of other relevant events.

Current relevant events may be rated according to importance. In addition, caller identities may be given a rating according to time of day. If the caller identity rating for the current time period matches the rating requirement for the current relevant event, then the caller will be allowed access.

In addition, any boundaries describing the beginning and ending of a current relevant event may be weighted according to importance. Graphically, an individual might designate a hard deadline for times between which a particular caller is allowed access to the callee. However, the individual might also designate a shaded area for when a caller may call, but only in certain contexts, such as an emergency.

Further, callers may be provided with a call budget. For example, John may allow his mom to call him twice a week. John may further restrict the times when his mom may use her budget of two calls per week. However, John may also provide his mom with emergency vouchers that may be used at any time in case of an emergency.

Advantageously, the destination service provider may initiate a context inference service to determine the context of the recipient side of a call. Determining the context of the recipient side of a call may be performed in a manner similar to that described with reference to determining the context of the caller side of a call. In addition, as will be further described, context inferences may be further enhanced when caller side and recipient side context information is combined.

In particular, the identity of the callee answering the call is preferably authenticated and profiles accessed for the line subscriber and/or callee. Returning an RVID determined for the callee to the caller is advantageous because the RVID preferably includes the callee name and information about the transfer.

Advantageously, the identities of parties to a call and other context of the call are monitored during the call and call context is dynamically adjusted. As a call context adjusts, the ratings and scheduled events associated with the call context preferably also adjust.

In addition, advantageously, where a caller is blocked from access to a destination device during a current time period, the next available time period is preferably searched for within the scheduled events for a destination device. The caller may be alerted as to the next available time period. In addition, the caller may select to reserve the next available time period in a schedule for the destination device. An automated system preferably guides the caller through the scheduling process.

Figure 4A:
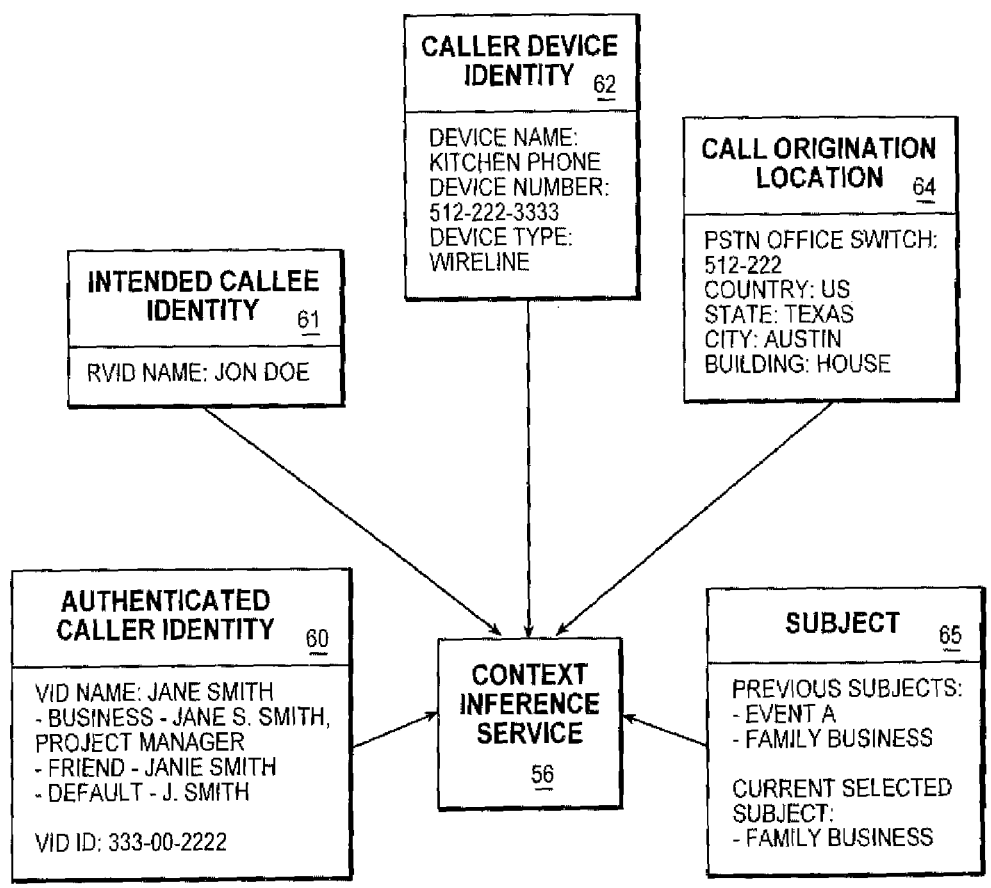
FIGS. 4a–4b illustrate an illustrative example of context information associated with a call in accordance with the method, system, and program of the present invention.
Figure 4B:
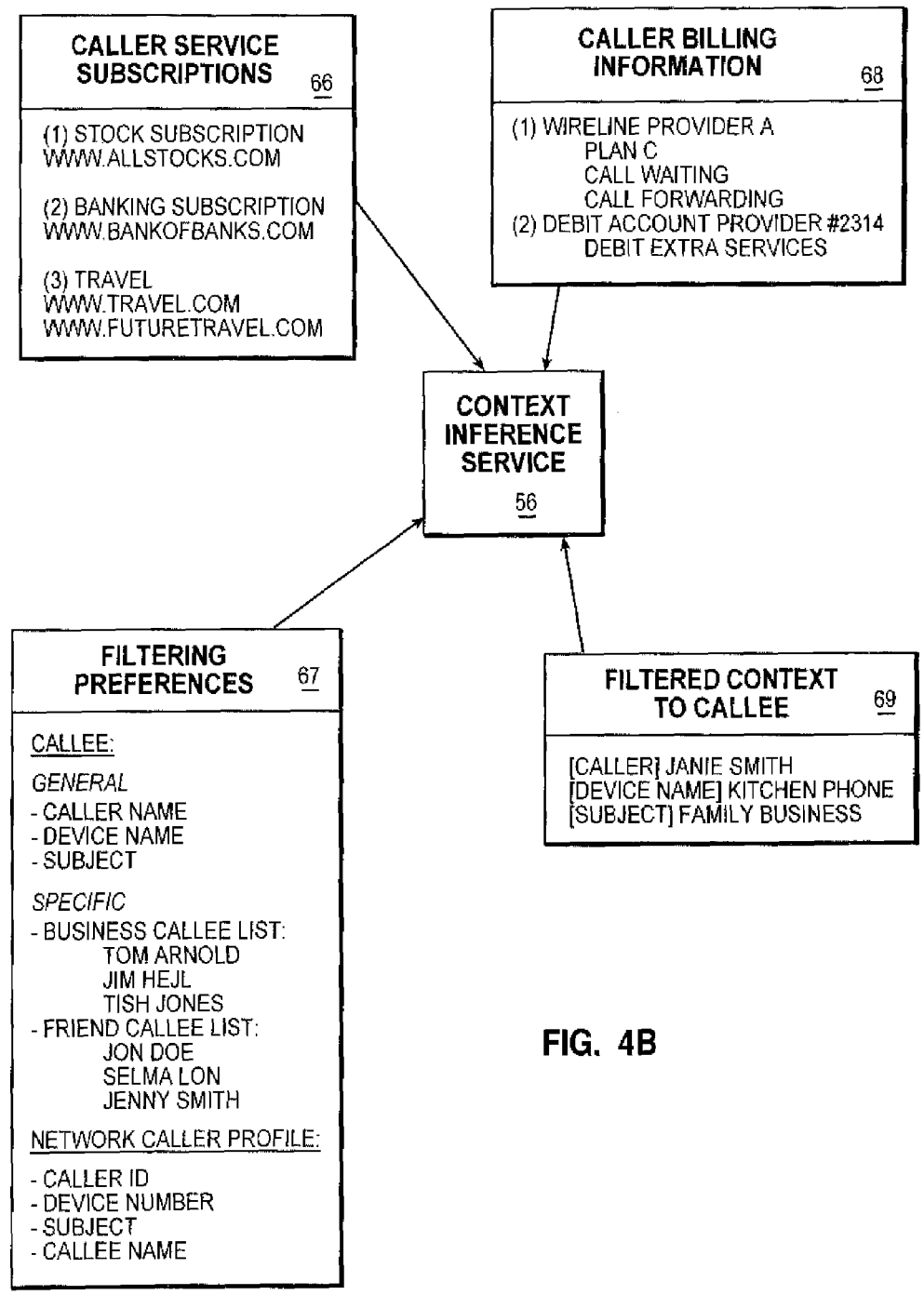

Referring now to FIGS. 4a–4b, there is depicted an illustrative example of context information associated with a call in accordance with the method, system, and program of the present invention. As illustrated, multiple types of context information may be accessed and determined by context inference service 56. In addition to the examples depicted, in alternate embodiments, other types of context information may be accessed and determined.

In the example, a call is placed by AJane Smith@ to AJon Doe@. For purposes of illustration, context inference service 56 is determining the context for a call from the perspective of the caller, with reference to the identity of the callee. However, call context may also be determined from the caller and callee perspectives concurrently or independently.

First, authenticated caller identity context 60 is retrieved to indicate who is calling. Advantageously, the name and identifier of a caller may be determined by authenticating the voice of the caller or utilizing other caller identification. An authenticated identity may also indicate, for example, the device utilized to perform the authentication, the frequency of identity of authentication, and the number to tries to achieve identity authentication.

Advantageously, a caller may provide multiple variations of a name categorized according to the type of callee receiving the VID. For example, a business associate may receive the caller's full name and job title. A friend may receive the caller's nickname. As will be further described, the VID name is preferably filtered for output to a callee according to caller preferences and the callee identity.

Next, caller device identity context 62 is determined to indicate the device utilized to place the call. An origin device may provide device identification or the context inference service may detect and/or infer the device identity. In the example, device identity context includes the name of the device, the line number associated with the device and the type of device. The name of a device may include a specific phone within a business or home or may indicate the line subscriber of the line number. In addition, the name of the device may include a server system or private switching network identifier enabling the origin device. The device type may indicate whether a wireless or wireline connection is utilized by the device. Further, the type of device may further specify the type of device associated with the connection, such as a home phone line, a PBX land line, and a wireless car phone.

A call origination location context 64 is also determined to indicate the geographical location of the origination of a call and provide information for determining a device identity. A GPS location of an origin device may be transmitted with the call or detected by an intermediary device. In addition, the context inference service may determine a general location of an origin device based on the geographical area serviced by a PSTN switching network or wireless service provider service area. In the example, the PSTN switching network office switch receiving the call is identified by the numbers serviced by that office switch. The context inference service may then lookup the office switch geographical area, which in the present example includes country, state, and city identifiers. Further, in the example, the context inference server may lookup the line number to determine the type of building assigned to the line number, here Aresidential@.

Further, caller service subscriptions context 66 is depicted to indicate the services selected by a caller. A caller may subscribe to services accessible via telephone that are accessible according to the caller VID. In the example, caller service subscriptions include a stock subscription, a banking subscription, and travel subscriptions. Such subscriptions may charge the caller per access or may authorize the service to call the caller when criteria indicated by the caller occur. Indicating caller service subscriptions enhances context when a caller makes a call to a service already subscribed to or to a service not yet subscribed to.

In addition, caller billing information context 68 is provided to indicate the billing selections of a caller. Each caller may select multiple service providers and billing options that are accessible according to the caller VID. In the example, a caller has selected a wireline provider A and a debit account provider. Wireline provider A preferably services the current call. Extra services requested by the caller are preferably charged to the caller's debit account. The context inference engine may filter billing information to indicate a portion of a call the caller will pay for, service available for the call, and whether the caller will pay for additional services.

A subject context 65 indicates previous subjects of calls by the caller from the device. The caller may be prompted to select from one of these previous subjects, stored according to VID in the caller profile. In this example, the caller has selected the subject of the call as Afamily business@. A caller may further select a level of urgency of the call, specify the type of family business, or other further specifications of the subject matter of a call. In addition to storing previous subjects according to caller and device, previous subjects may be stored according to the caller/callee combination, and retrieved when the caller/callee combination is detected. Moreover, a caller may be enabled to search through the database of previous subjects, organized according to caller, device, callee, time, location, and other criteria. A caller may also have a list of Afavorite subject matter@ from which quick subject matter selections may be made.

Filtering preferences context 67 are preferably accessed from a caller profile. In the example, filtering preferences are first divided according to the place a VID is transferred. The VID may be transferred to a callee, to a network location for storage according to VID in a caller profile, to an incoming caller and to a data mining service or other vendors allowed access to VIDs and RVIDs of current calls. Preferably, a caller is allowed to set filtering preferences for the portions of the total context that are transferred to each entity. In particular, while not depicted, a caller may specify preferences for filtering context information for display to a call incoming while another call is already in progress. For example, such preferences may filter which incoming callers are allowed to view the identities of the parties to the current call and other context thereof.

Further, the caller may further specify the callee category according to the actual callee. Here, in general, the caller elects for only the name, device name, and subject of the call to be transferred to callees. However, the caller further specifies a first group of RVIDs that are to receive the business name for the caller and a second group of RVIDs that are to receive the friend name for the caller. Others, receive the caller's default name.

As an example, filtered call context to the callee 69 includes the tagged VID for transfer to the callee, including context information. Here, the callee RVID is included in the friend group, so the friend name is output. In particular, an intended callee context 61 identified by the caller indicates the RVID of the callee, who is included in the friend list. In addition, the device name and subject matter are output. A filtered call context to a network caller profile storage server might only include a VID ID, device ID and subject matter.

Figure 5:
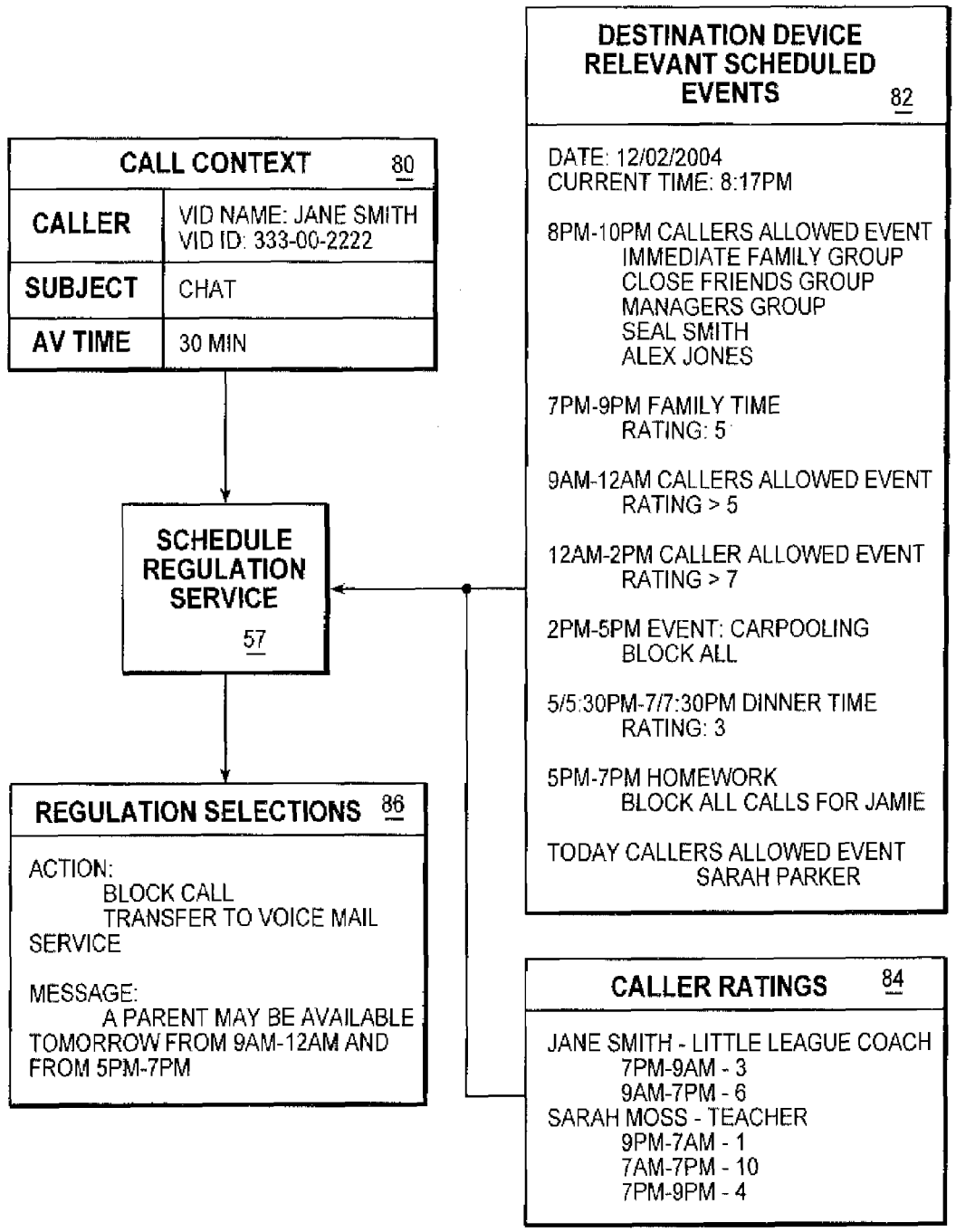
FIG. 5 depicts an illustrative example of regulating a call received according to time based criteria in accordance with the method, system, and program of the present invention.

Referring now to FIG. 5, there is depicted a an illustrative example of regulating a call received according to time based criteria in accordance with the method, system, and program of the present invention. In the example, a call context 80 is received from a context inference service. The authenticated identity of the caller, the subject of the call, and the caller's average time per call on the subject are provided in call context 80. In alternate embodiments, alternate types of context information may be provided.

Schedule regulations service 57 preferably receives the call context and searches a schedule for a destination device to determine a selection of destination device relevant scheduled events 82. In the example, relevant scheduled events include events occurring during the current time, events relevant to determining call times available to the caller at the destination device, and general events for the day.

As illustrated, some events are rated on a scale of "1" to "10". In addition, callers are individually rated according to times of day in caller ratings 84. In the example, the caller is currently rated a "3" and therefore is not rated high enough to access the destination device during "family time".

A regulation selection 86 is determined by schedule regulation service 57 to define the caller's access to the destination device. In the example, the current caller is blocked from access to the destination device because the caller is not included in callers currently allowed or allowed by rating during another current relevant event.

Actions may include activating the destination device to ring, blocking the call, transferring the call, and other actions available for processing a call. In the example, the call action includes blocking the call from ringing the destination device. In addition, the call action includes transferring the call to the voice mail service.

In addition, a message may be formulated by schedule regulation service or pre-recorded. In the example, from the relevant scheduled events, it is determined that a parent may be available at the destination device and that the caller will be allowed to ring through between certain hours. By providing the caller with an opportunity to leave a message and providing times to call back, communications may still occur without requiring interruptions into a home, office, or other location through a ringing telephony device.

It should be mentioned that the schedule for a destination device may be designated by the line subscriber for a destination device, by at least one party with access to a destination device, or by a third party.

Figure 6:
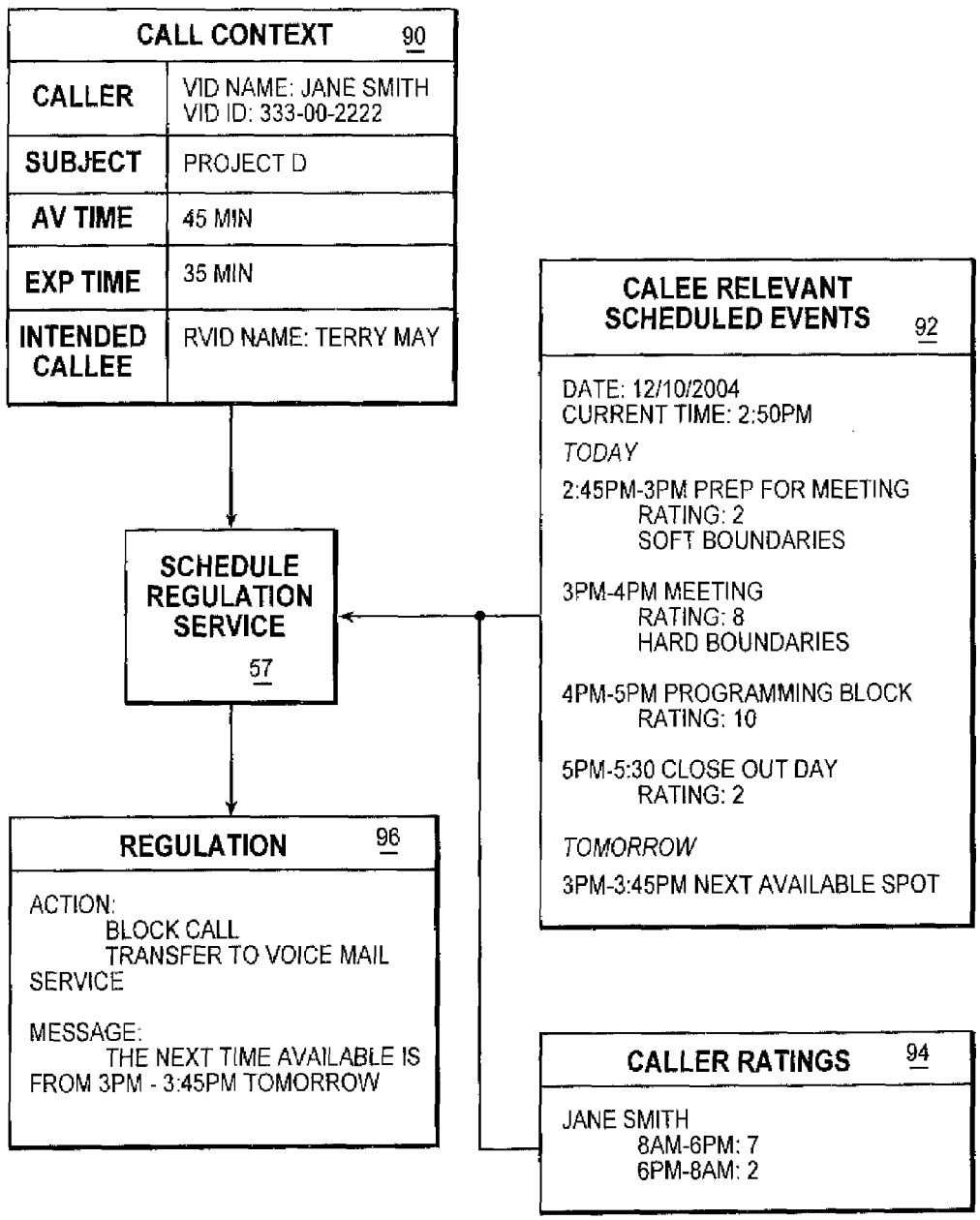
FIG. 6 illustrates an illustrative example of regulating a call initiated according to time based criteria in accordance with the method, system, and program of the present invention.

With reference now to FIG. 6, there is illustrated an illustrative example of regulating a call initiated according to time based criteria in accordance with the method, system, and program of the present invention. In the example, a call context 90 includes a caller identity, subject of a call, intended callee, average time per call, and expected time designated by the caller.

In the example, a schedule compiled for the callee is filtered for callee relevant scheduled events 92. The scheduled events in the example are illustrated to show the estimated time for the call does not allow for the caller to fit into the callee's schedule until the next day. For example, the current time is 2:50, fitting into the "prep for meeting" event. However, the caller is not allowed to ring through to the callee during the current day since the estimated time for the call is longer than the time available during the "prep for meeting" event, the caller's rating does not allow access during the "meeting" event or "programming block" event, and the estimated time for the call will not fit within the "close out day" event.

The most relevant event is that the next available spot long enough for the estimated time of the call. Schedule regulation service 57 determines regulation selections 96 the actions of blocking the call and transferring the call. In addition, regulation selections 96 include a message indicating a time for the next available window of time to reach the callee.

Advantageously, when a call is currently blocked, but an available time for the caller to be rung through is determined, the caller is provided with additional options to select from the available time and be added to the callee's schedule. The callee may also request the opportunity to accept or decline the addition.

Figure 7A:
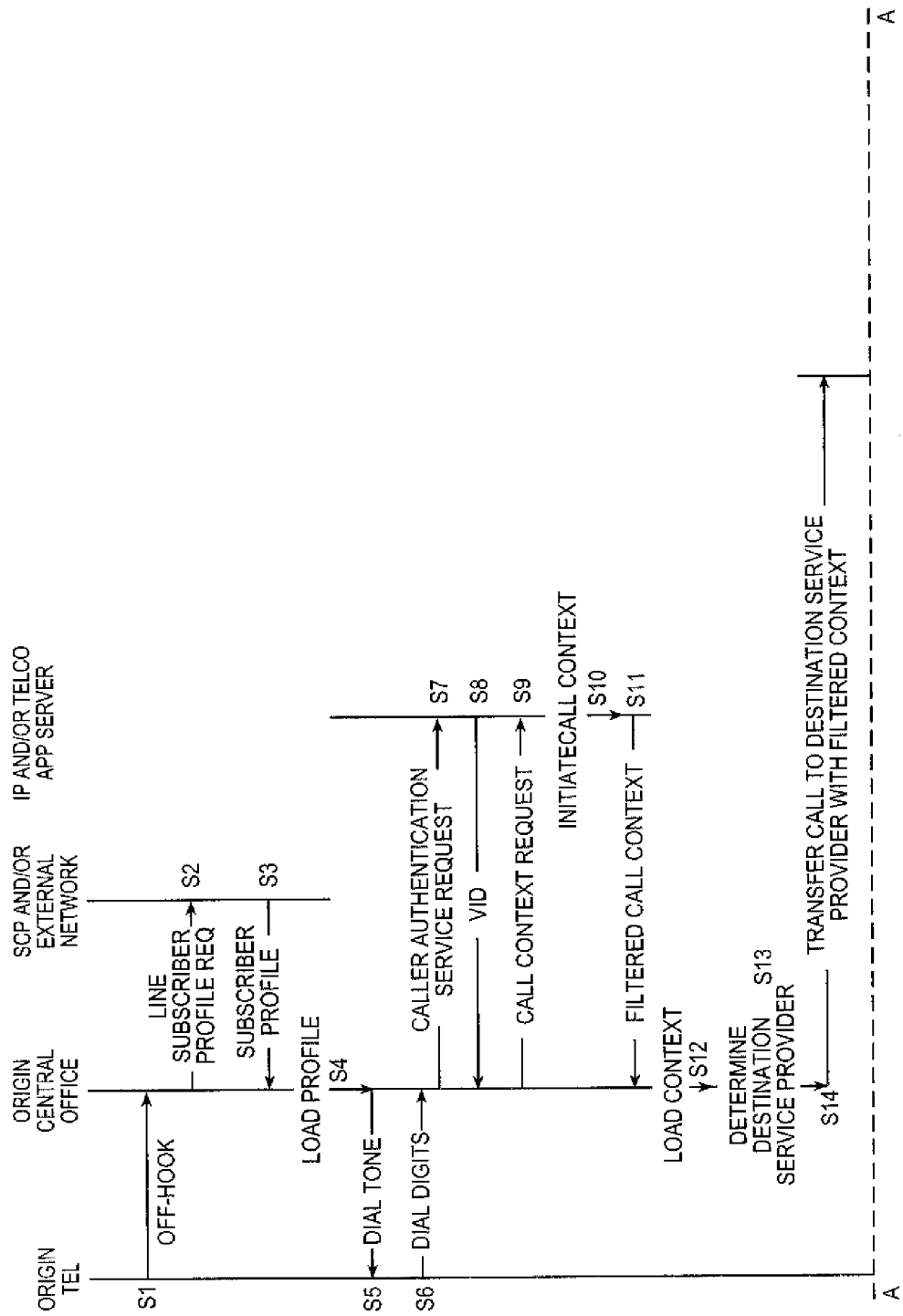
FIGS. 7a–7b depict a flow diagram of a signal flow and processing of a call in accordance with the method, system, and program of the present invention.
Figure 7B:
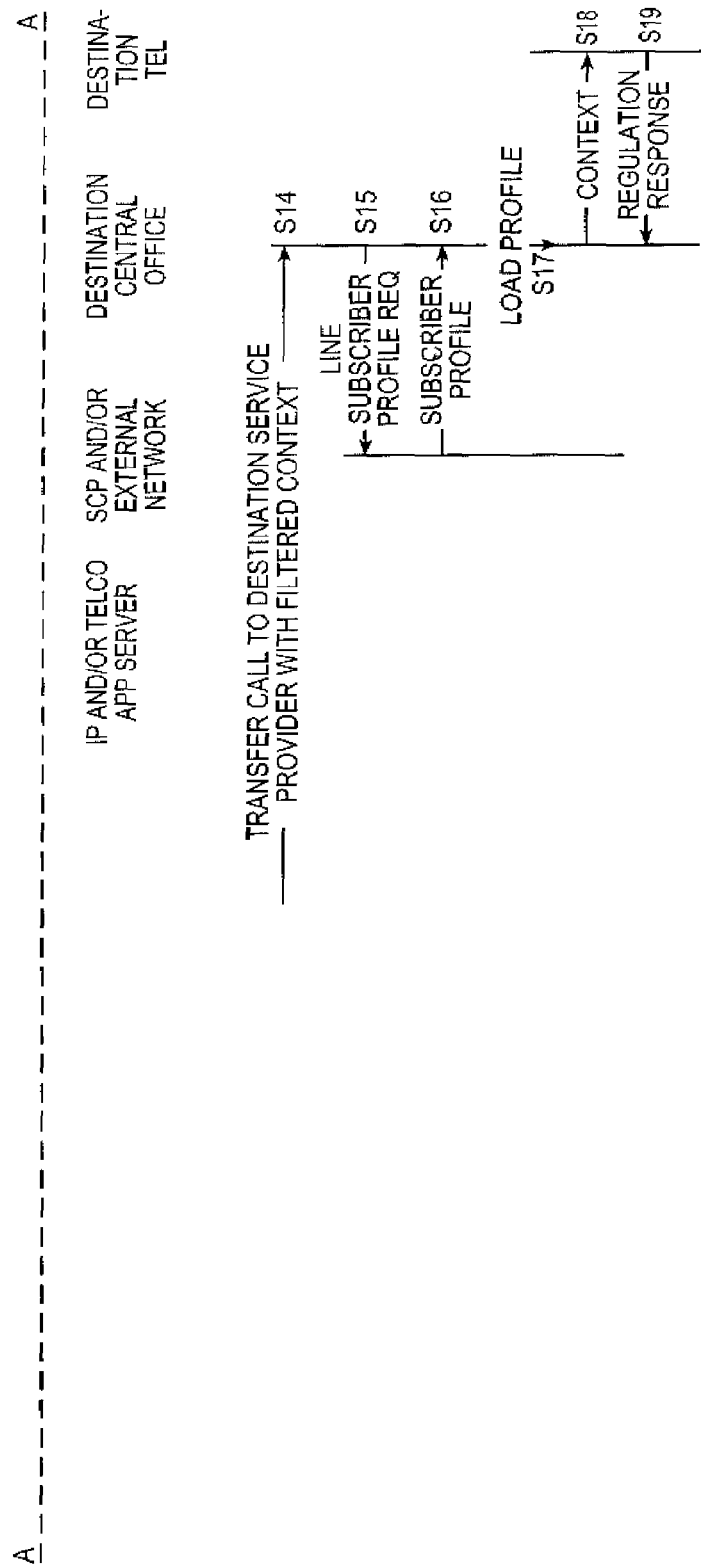

Referring now to FIGS. 7a–7b, there is depicted a flow diagram of a signal flow and processing of a call in accordance with the method, system, and program of the present invention. A standard telephone device is assumed for the Atel@ origin device and destination device in the present example. However, a similar signal flow may be applied to other types of origin and destination devices, including server systems, private switching networks, and call centers. Further, the flow is described with reference to wireline devices, however is not limited in application to wireline devices.

The caller lifts a handset creating an off-hook state in the origin device and a corresponding change in state of an off-hook signal to the central office (step S1). In response to detecting an off-hook state in the origin device, the central office establishes a register for the call and requests a line subscriber profile from the SCP and/or an external network server (step S2). A line subscriber profile including preferred services and a billing plan is returned to the central office (step S3). The central office loads the line subscriber profile into the call register (step S4) and extends a dial tone to the origin device (step S5).

The origin device then transmits dialed digits to the central office (step S6). A caller may utilize a keypad to enter a telephone number or utilize a voice dial feature if available. In addition, a caller may provide an intended callee identifier. Dialed digits may be received at other points in the process and loaded into the call register until needed for processing the call.

Next, the central office extends a caller authentication service request to an authentication service available from an IP or telco application service (step S7). A VID is preferably determined from authenticating a biometic input provided by the caller, such as a voice sample. The VID is returned to the origin central office (step S8).

Thereafter, the central office extends a call context request to a context inference service available from an IP or telco application server (step S9). A call context inference is initiated (step S10). The context inference service preferably accesses and loads a caller profile according to VID into the origin call register. Utilizing the line number, line subscriber profile, VID and caller profile, the context inference service preferably determines a context for the call.

The context inference service preferably filters the context and designates certain portions of the context for receipt by certain entities. The filtered call context is returned to the origin central office (step S11). Next, the context is loaded into the call register (step S12).

Next, the destination service provider for the requested digits is determined (step S13) and the call is transferred with the filtered context to the selected destination service provider (step S14). A request is extended from the destination central office to the SCP or external network for a line subscriber profile (step S15). The line subscriber profile is returned to the destination central office (step S16) and loaded into the destination central office (step S17).

In the example depicted, the context for the call with the destination device line subscriber profile is transferred to the destination telephony device (step S18). The destination telephony device preferably determines a regulation for the call from the caller VID and call context in view of callee and/or destination device relevant scheduled events. In particular, the destination telephony device may include a schedule regulation service or the destination telephony device may access a schedule regulation service from the telco application server. The regulation response preferably designates whether the a ring through will be allowed through the destination telephony device or whether the call is blocked (step S19).

Alternatively, the destination central office may access a schedule regulation service and receive the call regulation prior to accessing the destination device. In particular, the destination central office may access the schedule regulation service from an IP within the trusted telephone network or from a schedule regulation service within a telco application service external to said trusted telephone network.

Figure 8:
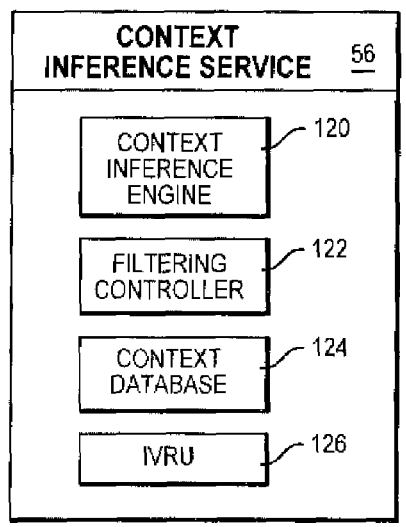
FIG. 8 illustrates a block diagram of a context inference service in accordance with the method, system, and program of the present invention.

With reference now to FIG. 8, there is illustrated a block diagram of a context inference service in accordance with the method, system, and program of the present invention. Context inference service 56 is preferably housed within a computing system including at least a processor, memory, system software, application software, and network software that execute to provide a telco service.

In particular, context inference service 56 includes a context inference engine 120. Context inference engine 120 preferably determines the context for a call through information accessible for the call and through inferences from that information. In addition, context inference engine 120 may filter context information for each entity receiving that information.

A filtering controller 122 preferably filters context determined by context inference engine 120 according to filtering preferences of the caller. In addition, the line number subscriber may designate filtering preferences for context including the line number.

A context database 124 preferably records and stores context for each call processed by context inference service 56. Context database 124 may be later accessed to provide verification and context for billed call transactions. In addition, context database 124 may store records of lengths of calls such that lengths of future calls may be predicted.

An interactive voice recognition unit (IVRU) 126 preferably prompts the caller and callee to provide information required for determining context and detects caller or callee entries. In addition, IVRU 126 may prompt the caller and callee to designate additional preferences for filtering context.

Figure 9:
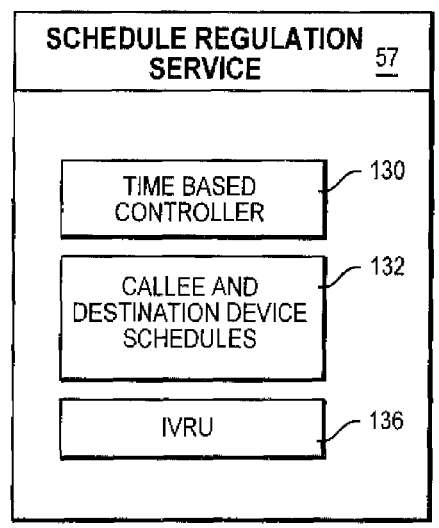
FIG. 9 depicts a block diagram of a context regulation service in accordance with the method, system, and program of the present invention.

Referring now to FIG. 9, there is illustrated a block diagram of a schedule regulation service in accordance with the method, system, and program of the present invention. Schedule regulation service 57 is preferably housed within a computing system including at least a processor, memory, system software, application software, and network software that execute to provide a telco service.

In particular, schedule regulation service 57 includes a time based controller 130. Time based controller 130 preferably receives the context for a call, determines relevant scheduled events for a callee and/or destination device, and designates regulation actions for the call. Regulation actions may include ringing a call through, blocking the call, transferring the call, and other actions for processing a call.

Callee and destination device schedules 132 may be accessed from a destination device, from other devices within a local broadcast range of a callee or destination device, from an external database, and from databases within the trusted telephone network. Schedules for multiple available callees may be accessed into callee and destination device schedules 132 for filtering to determine relevant scheduled events according to the call context.

An IVRU 136 may prompt a caller to indicate the estimated time for a call, prompt both the caller and callee with time remaining for a call according to relevant scheduled events, and prompt a callee to select whether to continue a call in view of other relevant scheduled events.

Figure 10:
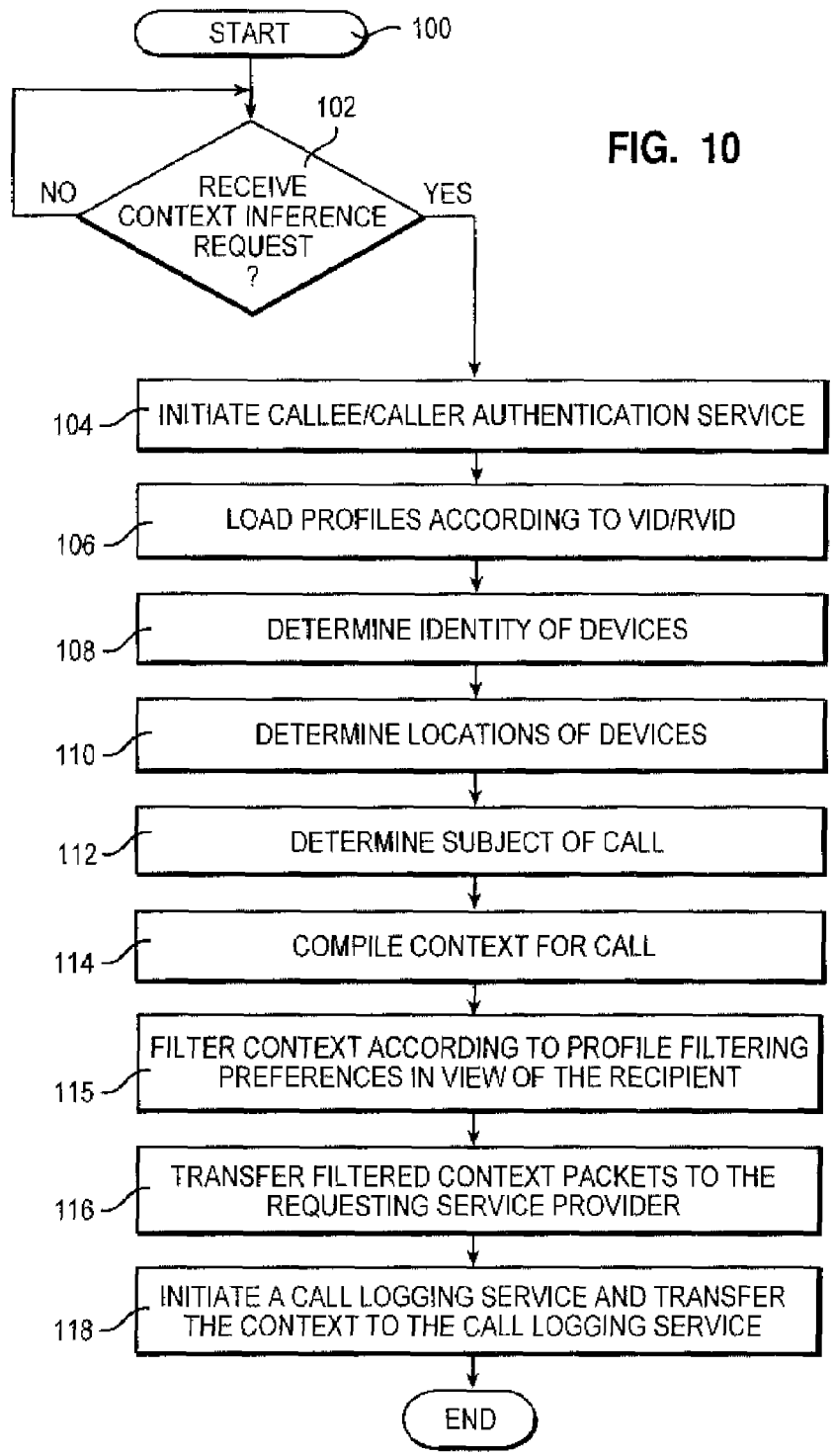
FIG. 10 illustrates a high level logic flowchart of a process and program for controlling a context inference service in accordance with the method, system, and program of the present invention.

Referring now to FIG. 10, there is illustrated a high level logic flowchart of a process and program for determining call context in accordance with the present invention. As depicted, the process starts at block 100 and thereafter proceeds to block 102. Block 102 illustrates a determination as to whether a call context request is received. If a call context request is not received, then the process iterates at block 102. If call context request is received, then the process passes to block 104. A call context request may also include line subscriber profile information and other call information already loaded by the requesting service provider.

Block 104 depicts initiating a caller/callee identity authentication service. Next, block 106 illustrates loading profiles according to the VID/RVID authenticated for the caller/callee. Alternatively, VID/RVID for the call may be transferred with the call context request.

Next, block 108 illustrates determining the identity of any devices utilized in the call. Where a server enables a call from an individual telephone device, the identities of the individual telephone device and the server are preferably determined. Device identity may be determined from the line subscriber identity, a device identity output by the device, the type of service subscribed to for the device, and other available profile information.

Block 110 depicts determining the locations of any devices utilized in the call. Location may be precisely detected from a GPS coordinate. Alternatively, location may be inferred within a general area according to the geographical area covered by an office switch or a wireless tower originating or terminating the call. Further, location may be determined by the physical address assigned to a line number.

Block 112 illustrates determining the subject matter of a call. Subject matter may be inferred, for example, from services subscribed to by the caller/callee, from previous subject matter of calls between the parties, from the location of the calling party, or from the device identities. In addition, a party to a call may be prompted to indicate the subject matter of a call.

Thereafter, block 114 depicts compiling the context information for a call. In compiling context information, the information utilized to determine context is preferably consolidated into general context categories. In addition, block 115 illustrates filtering the context information for a call according to caller and callee profile preferences. Next, block 116 illustrates transferring the call context to the requesting service provider.

Block 118 depicts initiating a call logging service and transferring the call context to the call logging service, and the process ends. In particular, a caller or callee profile may indicate call logging preferences that are included in the context transferred to the call logging service. Alternatively, the call logging service may access call logging preferences for the caller, callee, or third party.

Figure 11:
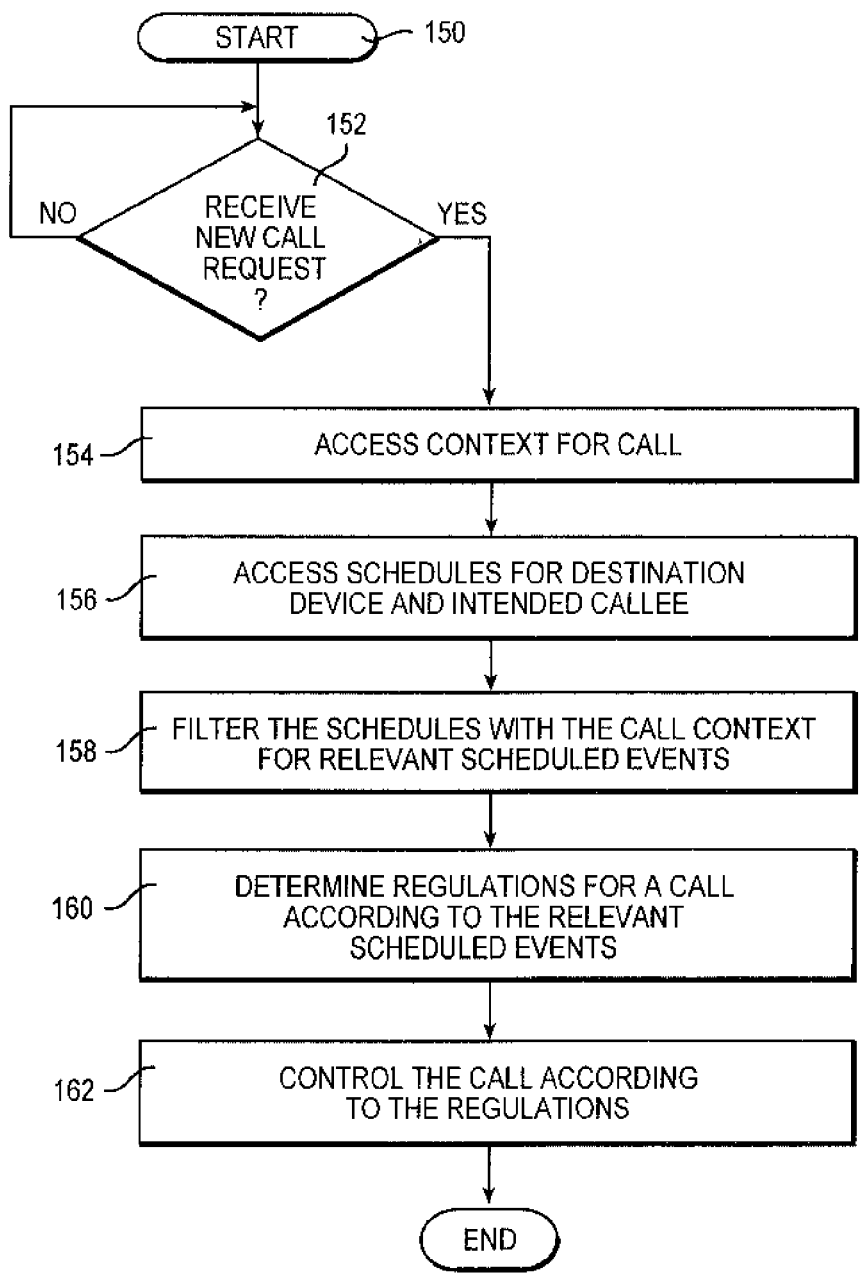
FIG. 11 depicts a high level logic flowchart of a process and program for controlling a time based regulation service in accordance with the method, system, and program of the present invention.

With reference now to FIG. 11, there is depicted a high level logic flowchart of a process and program for controlling a time based regulation service in accordance with the method, system, and program of the present invention. As illustrated, the process starts at block 150 and thereafter proceeds to block 152. Block 152 depicts a determination as to whether a new call request is received. If a new call request is not received, then the process iterates at block 152. If a new call request is received, then the process passes to block 154.

Block 154 illustrates accessing the context for a call. The context for a call may be accessed from a context inference service, from a caller authentication service, or from the line number from which a call originates. Next, block 156 depicts accessing schedules for the destination device and/or intended callee. Schedules may be inferred from other context, detected from electronic events designated at the destination device, and from other electronic calendaring associated with a destination device and/or intended callees.

Block 158 illustrates filtering the schedules with the call context to determine relevant scheduled events. Relevant scheduled events may include, for example, events which show why a call is currently blocked and indicate when the next available opening for the caller will occur. Next, block 160 depicts determining the regulations for a call according to the relevant scheduled events. The regulations preferably indicate the actions to be taken in processing a call and the textual or automated voice messages and other options to be output to the caller. Thereafter, block 162 illustrates controlling the call according to the regulations, and the process ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for regulating access to a callee at a communication device accessible to said callee, comprising:
    detecting, at a telephone service provider for a callee within a trusted telephone network, a call initiated by a caller and intended for said callee;
    detecting, at said telephone service provider, an authenticated identity of said caller placing said call to said callee; and
    only attempting, by said telephone service provider, a communication link between said caller and said callee if said authenticated identity of said caller is allowed access to said callee according to a schedule associated with an identity of said callee, wherein said schedule is accessible from at least one schedule storage service located within a packet-switching network outside said trusted telephone network and communicative with said telephone service provider via a secured gateway.

2. The method for regulating access according to claim 1, wherein said authenticated identity of said caller is authenticated by voice identification.

3. The method for regulating access according to claim 1, further comprising:
    accessing said schedule at a destination device available to said callee.

4. The method for regulating access according to claim 1, wherein attempting a communication link further comprises:
    allowing said call to ring through to a destination device available to said callee.

5. The method for regulating access according to claim 1, further comprising:
    regulating said call by blocking said caller from accessing a destination device available to said callee.

6. The method for regulating access according to claim 1, further comprising:
    regulating said call by transferring said call to a voice mail service.

7. The method for regulating access according to claim 1, further comprising:
    regulating said call by controlling output of a message to a caller indicating an available time for said caller to reach said callee, wherein said caller is prompted with a selectable option to request an appointment during said available time be added to said schedule for said callee; and
    responsive to receiving input from said caller of said selectable option, adding said appointment during said available time to said schedule for said callee, wherein said appointment restricts said callee to only receive a call from said caller during said available time.

8. A system for regulating access to a callee comprising:
    a communication system for enabling a caller to place a call intended for said callee, wherein said communication system comprises at least one telephone service provider within a trusted telephone network;
    said communication system further comprising:
    means for detecting an authenticated identity of said caller placing said call to said callee; and
    means for only attempting a communication link via said communication system between said caller and said callee if said authenticated identity of said caller is allowed access to said callee according to a schedule associated with an identity of said callee, wherein said schedule is accessible from at least one schedule storage service located within a packet-switching network outside said trusted telephone network and communicative with said communication system via a secured gateway.

9. The system for regulating access according to claim 8, wherein said authenticated identity of said caller is authenticated by voice identification.

10. The system for regulating access according to claim 8, further comprising:
    means for accessing said schedule at a destination device available to said callee.

11. The system for regulating access according to claim 8, wherein attempting a communication link further comprises:
    means for allowing said call to ring through to a destination device available to said callee.

12. The system for regulating access according to claim 8, further comprising:
    means for regulating said call by blocking said caller from accessing a destination device available to said callee.

13. The system for regulating access according to claim 8, further comprising:
    means for regulating said call by transferring said call to a voice mail service.

14. The system for regulating access according to claim 8, further comprising:
    means for regulating said call by controlling output of a message to a caller indicating an available time for said caller to reach said callee, wherein said caller is prompted with a selectable option to request an appointment during said available time be added to said schedule for said callee; and
    means, responsive to receiving input from said caller of said selectable option, for adding said appointment during said available time to said schedule for said callee, wherein said appointment restricts said callee to only receive a call from said caller during said available time.

15. A program for regulating access to a callee comprising:
    a recording medium;
    means, recorded on said recording medium, for detecting at at least one telephone service provider within a trusted telephone network, a call initiated by a caller and intended for said callee;
    means, recorded on said recording medium, for detecting an authenticated identity of said caller placing said call to said callee; and means, recorded on said recording medium, for only attempting a communication link through said telephone service provider between said caller and said callee if said authenticated identity of said caller is allowed access to said callee according to a schedule associated with an identity of said callee, wherein said schedule is accessible from at least one schedule storage service located within a packet-switching network outside said trusted telephone network and communicative with said telephone service provider via a secured gateway.

16. The program for regulating access according to claim 15, further comprising:
means, recorded on said recording medium, for accessing said schedule at a destination device available to said callee.

17. The program for regulating access according to claim 15, wherein attempting a communication link further comprises:
means, recorded on said recording medium, for allowing said call to ring through to a destination device available to said callee.

18. The program for regulating access according to claim 15, further comprising:
means, recorded on said recording medium, for regulating said call by blocking said caller from accessing a destination device available to said callee.

19. The program for regulating access according to claim 15, further comprising:
means, recorded on said recording medium, for regulating said call by transferring said call to a voice mail service.

20. The program for regulating access according to claim 15, further comprising:
means, recorded on said recording medium, for regulating said call by controlling output of a message to a caller indicating an available time for said caller to reach said callee, wherein said caller is prompted with a selectable option to request an appointment during said available time be added to said schedule for said callee; and
means, recorded on said recording medium, responsive to receiving input from said caller of said selectable option, for adding said appointment during said available time to said schedule for said callee, wherein said appointment restricts said callee to only receive a call from said caller during said available time.

21. A method for regulating access to a destination device comprising:
detecting, at a telephone service provider within a trusted telephone network an authenticated identity of a caller placing a call to a destination device; and
only attempting, by said telephone service provider, a communication link between said caller and said destination device if said authenticated identity of said caller is allowed access to said destination device according to a schedule associated with said destination device, wherein said schedule is accessible from at least one schedule storage service located within a packet-switching network outside said trusted telephone network and communicative with said telephone service provider via a secured gateway.

22. A method for time based regulation comprising:
detecting a context for a call comprising an identity of a caller and an anticipated call time; and
only attempting a communication link between said caller and a destination device if a time scheduled for said destination device is sufficient for said anticipated call time and said caller is allowed access to an intended callee at said destination device during said time scheduled.

23. A method for time based regulation of a destination device, comprising:
detecting a context for a call comprising an identity of a caller and an anticipated call time;
filtering a schedule for a destination device according to said context for said call to determine a selection of relevant scheduled events;
prompting said caller with a next available time for access to said destination device according to said selection of relevant scheduled events.

24. The method for time based regulation according to claim 23, wherein said schedule comprises at least one from among an allowed caller event, a rated event, and a next available time event.

25. The method for time based regulation according to claim 23, further comprising:
scheduling said caller in said schedule for said next available time.

26. A system for time based regulation of a destination device, comprising:
means for detecting a context for a call comprising an identity of a caller and an anticipated call time;
means for filtering a schedule for a destination device according to said context for said call to determine a selection of relevant scheduled events;
means for prompting said caller with a next available time for access to said destination device according to said selection of relevant scheduled events.

27. The system for time based regulation according to claim 26, wherein said schedule comprises at least one from among an allowed caller event, a rated event, and a next available time event.

28. The system for time based regulation according to claim 26, further comprising:
means for scheduling said caller in said schedule for said next available time.

29. A computer program product for time based regulation of a destination device, comprising:
a recording medium;
means, recorded on said recording medium, for detecting a context for a call comprising an identity of a caller and an anticipated call time;
means, recorded on said recording medium, for filtering a schedule for a destination device according to said context for said call to determine a selection of relevant scheduled events;
means, recorded on said recording medium, for prompting said caller with a next available time for access to said destination device according to said selection of relevant scheduled events.

30. The computer program product for time based regulation according to claim 29, further comprising:
means, recorded on said recording medium, for scheduling said caller in said schedule for said next available time.

* * * * *